Jan. 22, 1935.  E. F. KENNEDY ET AL  1,988,871

BROILER PAN

Filed March 28, 1932

INVENTORS,
Emmett F. Kennedy and
BY Joseph Terr

Fay Oberlin & Fay
ATTORNEYS.

Patented Jan. 22, 1935

1,988,871

UNITED STATES PATENT OFFICE 1,988,871

BROILER PAN

Emmett F. Kennedy, Garfield Heights, and Joseph Terr, Cleveland Heights, Ohio, assignors to The Cleveland Co-Operative Stove Company, Cleveland, Ohio, a corporation of Ohio Application March 28, 1932, Serial No. 601,580

5 Claims. (Cl. 53—5)

This invention relating as indicated to a broiler pan, has more particular reference to the provision of a food-supporting tray adapted to be used in conjunction with overhead burner ovens for the broiling of fish, fowl, meats, and other foods.

It is the general object and nature of our invention to provide a broiler pan which shall be capable of initially searing the under side of the food which is placed thereon in order to effect the retention of the natural juices in such food while at the same time permitting the removal of the fatty constituents from the food such as grease, and the like. It is a further object to provide a grease-receiving well which shall be normally positioned in the cold zone or at that point of the oven which is subjected to the least temperature, in order to prevent overheating and burning of the collected grease. Another object is to provide means for directing the flow of the greases and fatty fluids which are rendered from the food by virtue of the broiling heat, from a position under or near the food toward such receiving well. A further object is to provide a form of construction for such a broiler pan whereby it may be simply and economically manufactured. Additional objects and advantages shall become apparent as the following description proceeds. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
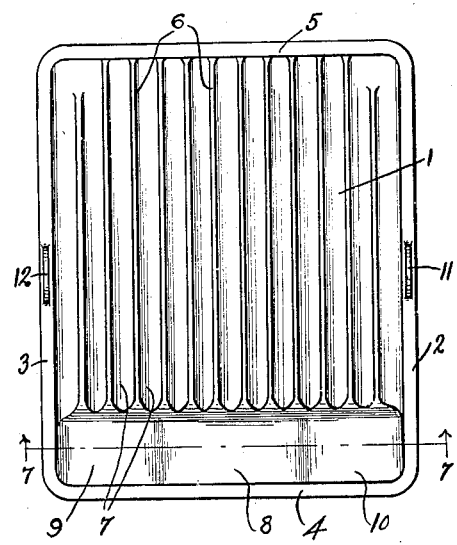
Figure 3:
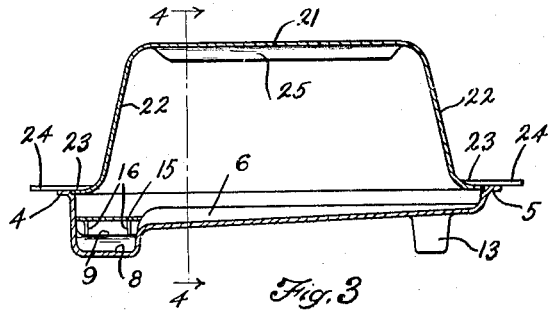
Figure 4:
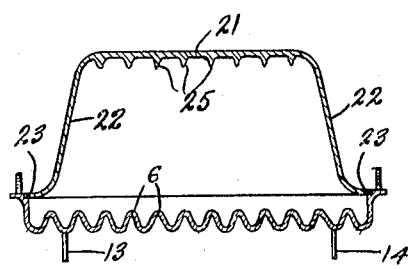
Figure 2:
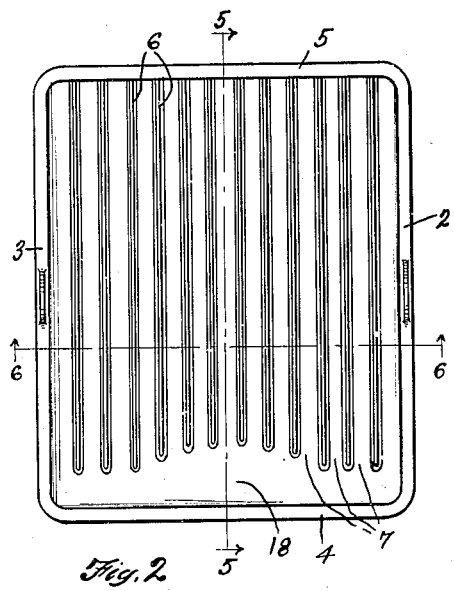
Figure 5:
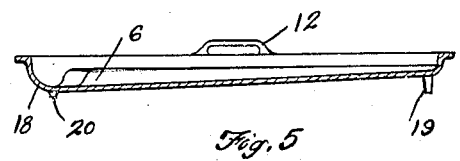
Figure 6:
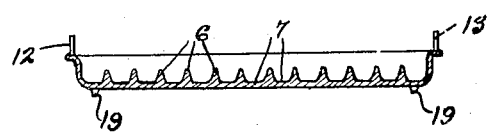
Figure 7:
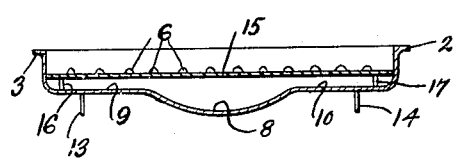

In said annexed drawing:

Fig. 1 is a top plan view of a broiler pan constructed according to the principle of our invention; Fig. 2 is a top plan view of a slightly modified design; Fig. 3 is a longitudinal sectional view of the form of broiling pan shown in Fig. 1 with a cover placed in position thereon in order to convert the combination into a roaster; Fig. 4 is a transverse section of Fig. 3 taken substantially upon the line 4—4 thereof; Fig. 5 is a longitudinal section of Fig. 2 taken substantially upon line 5—5 thereof; Fig. 6 is a transverse section taken substantially upon line 6—6 of Fig. 2; Fig. 7 is a section taken substantially upon line 7—7 of Fig. 1, and showing the collecting well cover plate in position.

Heretofore it has been customary in the construction of broiler pans for overhead burner ovens, and the like, to provide a stamped metal tray having a grille bar section or perforated plate tray positioned thereon for the purpose of supporting the food to be cooked. The result of the use of such prior art constructions was that the food would be subjected to an initial searing and cooking on one side only, permitting the inherent juices to drain out from the under side or uncooked side of the food. Briefly outlined, the presently described construction consists of a cast or stamped metal pan composed of a metal of relatively high thermal conductivity such as aluminum, and of a sufficient thickness to absorb an initial quantity of heat which, when radiated to the under side of the fresh food, will cause a searing action. A plurality of raised ribs on the bottom of the pan serve the double function of supporting the food completely out of contact with the bottom surface of the pan and enhancing such heat-radiating action. A plurality of sloping grooves defined by such raised ribs provide means for rapidly conducting the extracted greases from the vicinity of the cooked food to a forwardly disposed collecting well in order to prevent the steeping of the food in the grease vapors.

Now referring to the drawing and more particularly to Figs. 1, 3 and 7 thereof, the broiler pan which is indicated generally by the numeral 1, is rectangular in shape and has the laterally extending side flanges 2 and 3 and the front and rear flanges 4 and 5. The side flanges 2 and 4 are adapted to engage with the ordinary fins or ribs which are usually provided in the side walls in an oven. Of course, the broiler pan may be otherwise supported upon a suitable rack. The bottom portion of the pan is occupied by a plurality of longitudinal extending ribs 6. The ribs 6 serve to define a plurality of alternate grooves or channels 7 which inclined from the rear to the front of the pan. These ribs 6 are also of a sufficient height, and positioned in such lateral spaced relationship as to prevent the food from sagging in between and contacting with the bottom of the pan. In the front portion of the pan is disposed the grease-collecting well 8. A pair of tributary surfaces 9 and 10 are disposed on either side of the grease well 8 and serve as means for connecting the side channels 7 with the central well. A pair of bales or handles 11 and 12 are provided in the side flanges 2 and 3 respectively, so as to permit the convenient handling and lifting of the pan.

A pair of supporting legs 13 and 14 on the rear end of the pan, together with the bottom portion of the well 8 serve as contacting points for maintaining the pan in level position when it is placed upon a table or other flat surface.

A removable cover plate 15, as shown in Figs. 3 and 7, may be provided for the grease-collecting well 8. The cover plate 15 serves the function of insulating the grease-collecting well 8 from the heat of the burner elements. A double pair of supporting legs 16 and 17 are provided on the under side of the cover plate 15 in order to maintain it in raised position above the top level of the well 8.

Now referring to Figs. 2, 5 and 6, the design of the end well may be so modified as to occupy the lowermost portion of the bottom of the broiler pan, but at the same time to be of less depth than that of the well 8. In this modified form we have shown the grease-collecting well 18 which occupies the entire width of the forward portion of the broiler pan and forms a continuous extension of the conducting channels 7. The supporting legs 19 and 20 may be provided at points substantially adjacent the four corners of the pan and serve the double function of maintaining the pan in a level position when placed upon a table surface as well as effecting minimum contact with such surface in order to prevent burning or scorching thereof.

In order to convert the above described broiler pan into an efficient and novel roasting device, we have provided the auxiliary cover member 21. The cover 21 which is also rectangular in shape has the downwardly extending side walls 22 which terminate in the marginal flanges 23. The marginal flanges 23 are receivable into a complementary groove around the inner margins of the broiler pan 1. A pair of handles 24 are provided on the forward and rear ends of the cover 21 and are on a level with the top surface of the end flanges 4 and 5 whereby it is possible to grasp both the broiler pan and the cover at the same time. The under sides of the top surface of the cover 21 are provided with a plurality of longitudinally extending ribs or fins 25 which operate to more rapidly reflect and radiate heat throughout the interior of the roaster combination. The ribs 25 also serve the further purpose in that they provide a condensing surface which will cause any steam generated in the interior of the roaster to condense thereon and drop back upon the food, thus resulting in a self-basting action.

As has been hereinbefore set forth, it is contemplated that the above described device is to be fabricated of a metal of sufficient thickness and thermal conductivity as to radiate and reflect a sufficient amount of heat capable of searing the under side of food placed upon the pan. The upstanding ribs, it will be noted from Figs. 4 and 6, are of substantially inverted V-shaped cross section in order to enhance the reflection and radiation of heat in an upward direction. The use of aluminum is further recommended in that it possesses the property whereby meat and grease will not readily stick or adhere to its surface as is found to be the case wherein metals containing iron or zinc in appreciable quantities are used. Aluminum, of course, possesses the additional advantageous feature in that its coefficient of thermal conductivity is more than three times greater than that of iron or steel.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention.

1. A broiler pan composed of relatively thick cast metal for overhead burners and the like, having a plurality of longitudinally extending raised rib portions positioned on the bottom of said pan, the upper edges of said rib portions being normally disposed in a common horizontal plane, the bottom of said pan being inclined from rear to front, a grease collecting well on the forward end of said pan, and a relatively deeper portion in said well positioned centrally of its ends.

2. A broiler pan composed of relatively thick cast metal for overhead burners and the like, having a plurality of longitudinally extending raised rib portions positioned on the bottom of said pan, said rib portions being of inverted V-shaped cross section and adapted to radiate and reflect heat in an upward direction, the bottom of said pan being inclined from rear to front, a grease collecting well on the forward end of said pan, and a relatively deeper portion in said well positioned centrally of its ends.

3. A boiler pan composed of relatively thick cast metal for overhead burners and the like, having a plurality of longitudinally extending raised rib portions positioned on the bottom of said pan, the upper edges of said rib portions being normally disposed in a common horizontal plane, said rib portions being of inverted V-shaped cross section and adapted to radiate and reflect heat in an upward direction, the bottom of said pan being inclined from rear to front, a grease collecting well on the forward end of said pan, and a relatively deeper portion in said well positioned centrally of its ends.

4. A broiler pan composed of relatively thick cast metal for overhead burners and the like, having a plurality of longitudinally extending raised rib portions positioned on the bottom of said pan, the upper edges of said rib portions being normally disposed in a common horizontal plane, and a grease collecting well disposed in the front end of said pan contiguous to the ends of said ribs, said well having a relatively deeper portion positioned centrally of its ends.

5. A broiler pan composed of relatively thick cast metal for overhead burner ovens and the like, having a plurality of longitudinally extending raised rib portions positioned on the bottom of said pan, said rib portions being of inverted V-shaped cross section, a grease collecting well disposed across the front end of said pan and contiguous to the ends of said rib portions, an enlarged portion positioned centrally of said well, and a removable cover plate for said well, said cover plate being disposed above the base of said ribs.

EMMETT F. KENNEDY.
JOSEPH TERR.